US009961662B2

United States Patent
Mahasenan et al.

(10) Patent No.: US 9,961,662 B2
(45) Date of Patent: May 1, 2018

(54) SYSTEM FOR TRACKING ASSETS (71) Applicant: Honeywell International Inc., Morris Plains, NJ (US)

(72) Inventors: Arun V. Mahasenan, Trivandrum Kerala (IN); Amit Kulkarni, Medina, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/254,478

(22) Filed: Sep. 1, 2016

(65) Prior Publication Data

US 2018/0063808 A1    Mar. 1, 2018

(51) Int. Cl.
| | |
|---|---|
| *H04B 10/00* | (2013.01) |
| *H04W 64/00* | (2009.01) |
| *H04B 10/116* | (2013.01) |
| *G06K 7/10* | (2006.01) |
| *H04W 4/00* | (2018.01) |
| *H04W 84/12* | (2009.01) |

(52) U.S. Cl.
CPC ........ *H04W 64/00* (2013.01); *G06K 7/10366* (2013.01); *H04B 10/116* (2013.01); *H04W 4/008* (2013.01); *H04W 84/12* (2013.01)

(58) Field of Classification Search
CPC . H04B 10/116; H04B 10/112; H04B 10/1143; H04B 10/1149; H04W 4/026; H04W 4/04; H04W 4/023
USPC ........ 398/172, 118, 119, 128, 130, 127, 115, 398/135, 136, 182, 183, 33, 116; 315/312, 291, 293, 294, 307, 152
See application file for complete search history.

(56) References Cited

U.S. PATENT DOCUMENTS

| | | | |
|---|---|---|---|
| 9,287,976 B2 | 3/2016 | Ganick et al. | |
| 2002/0089722 A1 | 7/2002 | Perkins et al. | |
| 2008/0310850 A1 | 12/2008 | Pederson et al. | |
| 2014/0375982 A1 | 12/2014 | Jovicic et al. | |
| 2015/0147067 A1 | 5/2015 | Ryan et al. | |
| 2015/0372753 A1* | 12/2015 | Jovicic ................. | H04B 10/116 |
| | | | 398/172 |
| 2016/0018508 A1 | 1/2016 | Chen | |
| 2017/0187454 A1* | 6/2017 | Zhang .................. | H04B 10/116 |
| 2017/0237487 A1* | 8/2017 | Nyarko .................. | H04W 4/04 |

FOREIGN PATENT DOCUMENTS

WO    WO-2009/052455 A1    4/2009

OTHER PUBLICATIONS

"European Application Serial No. 17188516.3, Extended European Search Report dated Feb. 2, 2018", 8 pgs.

* cited by examiner

*Primary Examiner* — Hanh Phan
(74) *Attorney, Agent, or Firm* — Schwegman, Lundberg & Woessner, P.A.

(57) ABSTRACT

A system for tracking assets. The system includes a visible light source that includes a wireless signal generator configured to produce wireless signals and a tag that includes a detector that detects the presence of the wireless signals produced by the visible light source. The tag includes a transmitter that is configured to send additional wireless signals. The system further includes a tag monitor that includes a receiver that is configured to receive the additional wireless signals. The tag monitor determines a location of the tag based on the additional wireless signals received from the tag.

18 Claims, 5 Drawing Sheets

SYSTEM FOR TRACKING ASSETS

BACKGROUND

There are two common conventional systems and methods that are used to track assets throughout a particular area or location. These two known systems and methods include (i) smartphone-based navigation systems; and (ii) RTLS (real time location system) systems. These two conventional systems and methods typically require different infrastructures in order to track assets throughout a particular area or location.

One of the drawbacks with conventional RTLS systems is that it is oftentimes difficult to accurately locate assets throughout a particular area. In addition, conventional RTLS systems are often complex to install and usually require some form of hard-wired infrastructure. Finally, many of the signals that are used to track asset location in such systems are typically unable to provide a precise location within an area.

Some of the drawbacks that are associated with smartphone-based systems and methods is that a compatible smartphone is usually required to work with such systems and methods. In addition, any smartphone that is utilized within such systems and methods must usually require a particular type of software to be loaded onto the corresponding smartphone. Finally, the smartphone must include some form of emitting or detecting device that is compatible with the infrastructure that is utilized with a particular smartphone and/or software on the software.

SUMMARY

A system for tracking assets. The system includes a visible light source that includes a wireless signal generator configured to produce wireless signals and a tag that includes a detector that detects the presence of the wireless signals produced by the visible light source. The tag includes a transmitter that is configured to send additional wireless signals. The system further includes a tag monitor that includes a receiver that is configured to receive the additional wireless signals. The tag monitor determines a location of the tag based on the additional wireless signals received from the tag.

In another example form, the system includes a tag that include a wireless signal generator configured to produce wireless signals and a visible light source that includes a detector that detects the wireless signals from the tag. The visible light source includes a transmitter that is configured to send signals that include information relating to a location of the tag based on the wireless signals received from the tag. The system further includes a tag monitor that includes a receiver that is configured to receive the signals from the visible light source. The tag monitor determines a location of the tag based on the signals received from the visible light source.

In another example form, the system includes a visible light source that is configured to produce electromagnetic signals and a tag that includes a detector that detects the presence of the electromagnetic signals produced by the visible light source. The tag includes a transmitter that is configured to send wireless signals that include information as to the particular frequency of the electromagnetic signals that are detected by the detector. The system further includes a tag monitor having a receiver that is configured to receive the wireless signals. The tag monitor determines a location of the tag based on the wireless signals received from the tag. The tag monitor includes a database that includes Bluetooth signal distribution data relative to a location of the tag monitor. The tag monitor compares the wireless signals received from the tag with the Bluetooth signal distribution data in the database to estimate a location of the tag.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The systems and methods described herein may include an infrastructure that promotes relatively quick and accurate asset location. In addition, the systems and methods described herein may have a reduced installation cost; improved location accuracy and an integrated platform that supports utilizing wireless signals to track assets.

Figure 1:
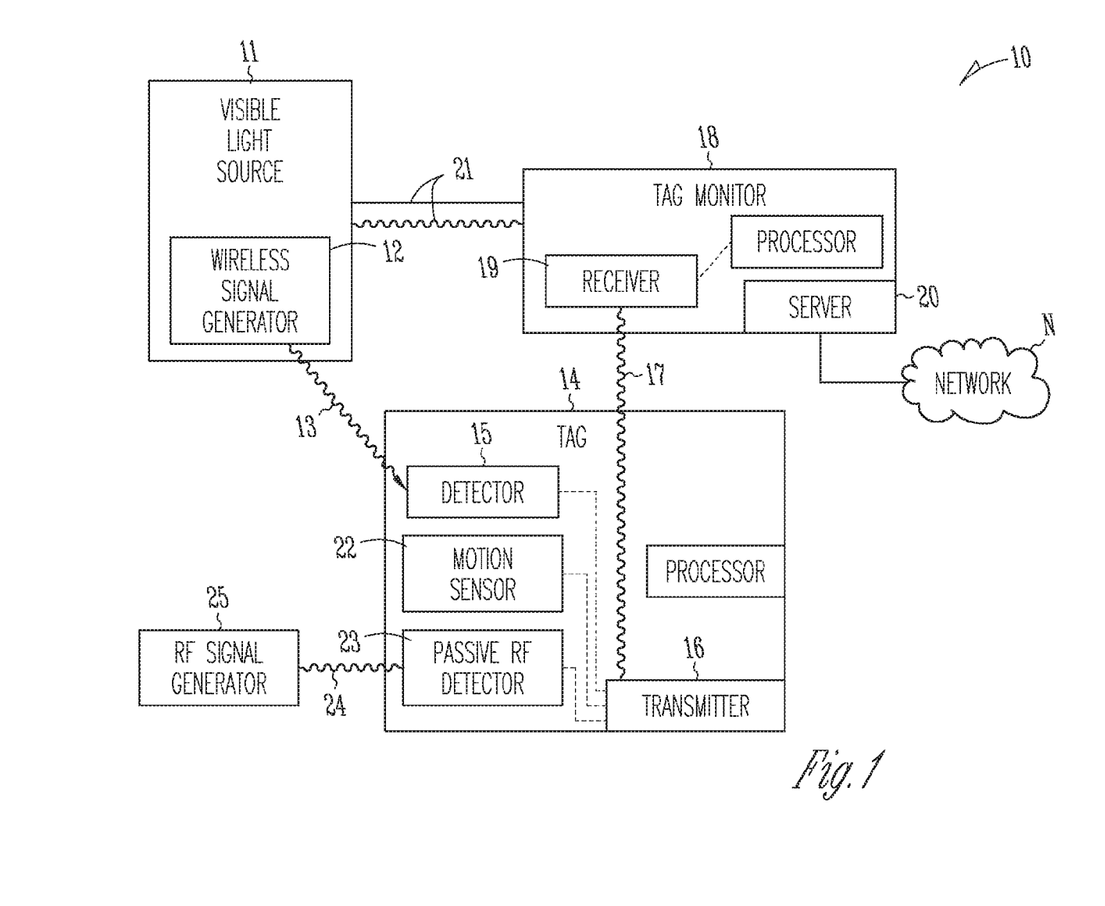
FIG. 1 illustrates an example system and method for tracking assets.

FIG. 1 illustrates an example system 10 and method for tracking assets. The system 10 includes a visible light source 11 that includes a wireless signal generator 12 that is configured to produce wireless signals 13.

The system 10 further includes a tag 14 that includes a detector 15 that detects the presence of the wireless signals 13 that are produced by the visible light source 11. The tag 14 further includes a transmitter 16 that is configured to send additional wireless signals 17.

The system 10 further includes a tag monitor 18 that includes a receiver 19 that is configured to receive the additional wireless signals 17. The tag monitor 18 determines a location of the tag 14 based on the additional wireless signals 17 that are received from the tag 14.

In some forms, the additional wireless signals 17 that are sent from the transmitter 16 to the tag monitor 18 are Bluetooth signals or Bluetooth low energy (BLE) signals. In other forms, the additional wireless signals 17 that are sent from the transmitter 16 to the tag monitor 18 may be Wi-Fi signals. In still another form, the additional wireless signals that are sent from the transmitter 16 to the tag monitor 17 may include both Bluetooth and Wi-Fi signals. It should be noted that other types of wireless signals that are known now, or developed in the future, are contemplated.

The system 10 may further include a server 20 that is part of a network N. The server 20 may receive the tag 14 location from the tag monitor 18 and provide the location to other devices (not shown) on the network N. As an example, the server 20 may provide the tag 14 location to other computers, tablets or handheld devices that could be connected to the network N.

In the example form shown in FIG. 1, the server 20 is integral with the tag monitor 18. It should be noted that other embodiments are contemplated where the server 20 is connected to the tag monitor 18 via a wired and/or wireless connection.

Figure 4:
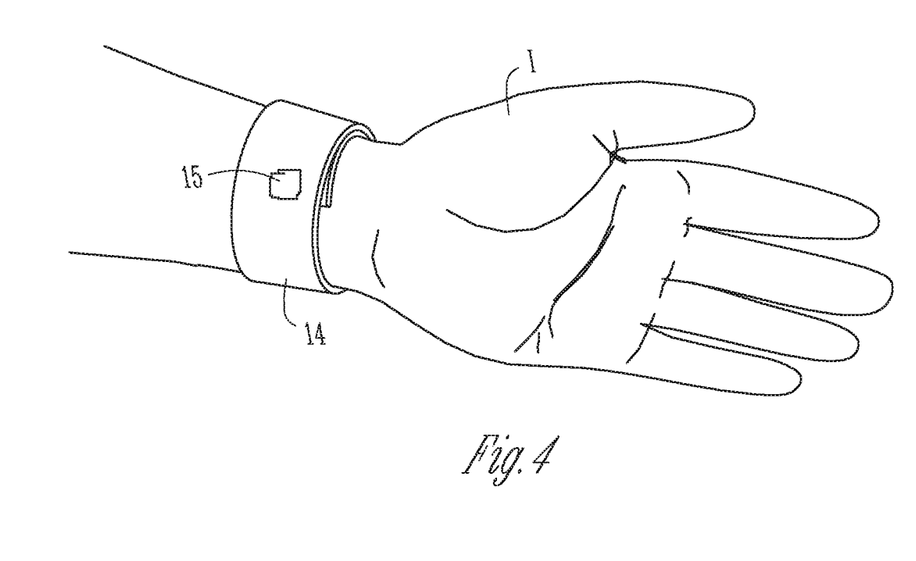
FIG. 4 illustrates an example tag that may be used in any of the systems and methods shown in FIGS. 1-3.

In some forms, the tag 14 may be configured to be worn by an individual. As examples, the tag may be part of any article (e.g., a bracelet (see FIG. 4), tag, cap, helmet, badge, or gown) that may be worn by an individual.

In other example forms, the tag 14 may be configured to be attached to any article of value (e.g. a box of jewels, a packet of drugs or any other asset of value). The tag 14 may include any type of electronic component(s) that is known know, or discovered in the future. The size, configuration and type of electronic components that are included in the tag 14 will depend in part on the type of asset that is to be tracked as well as the application where the system 10 is to be used (among other factors).

Figure 2:
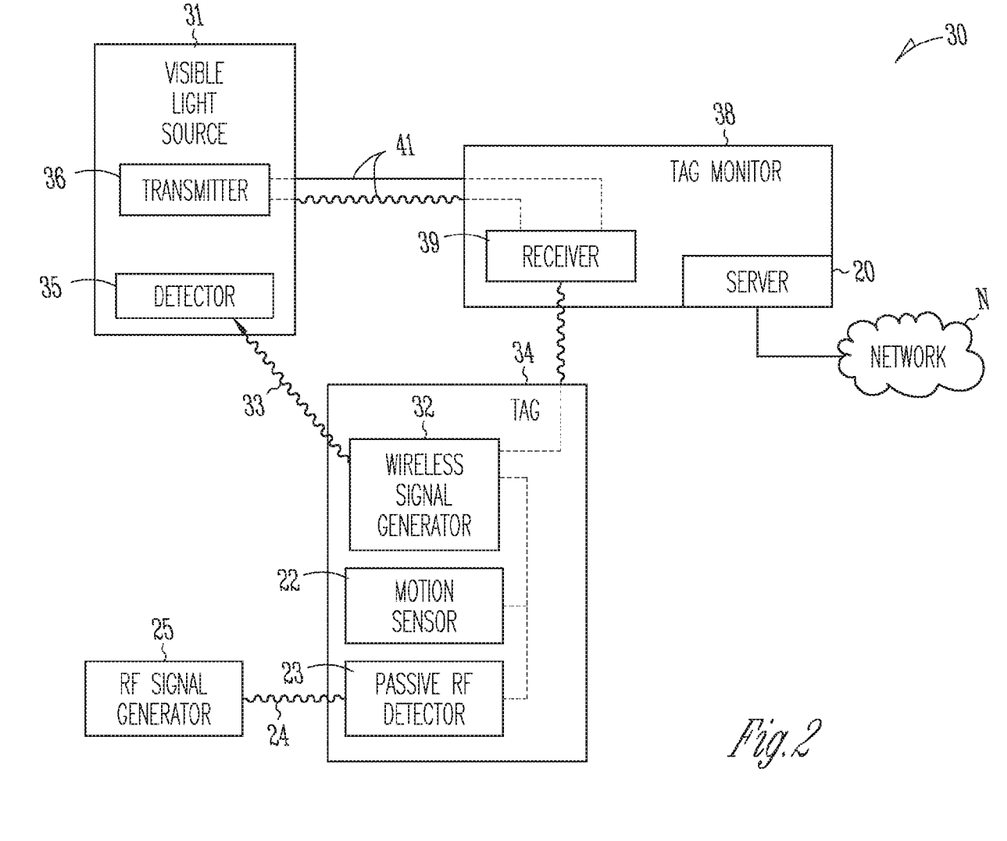
FIG. 2 illustrates another example system and method for tracking assets.
Figure 3:
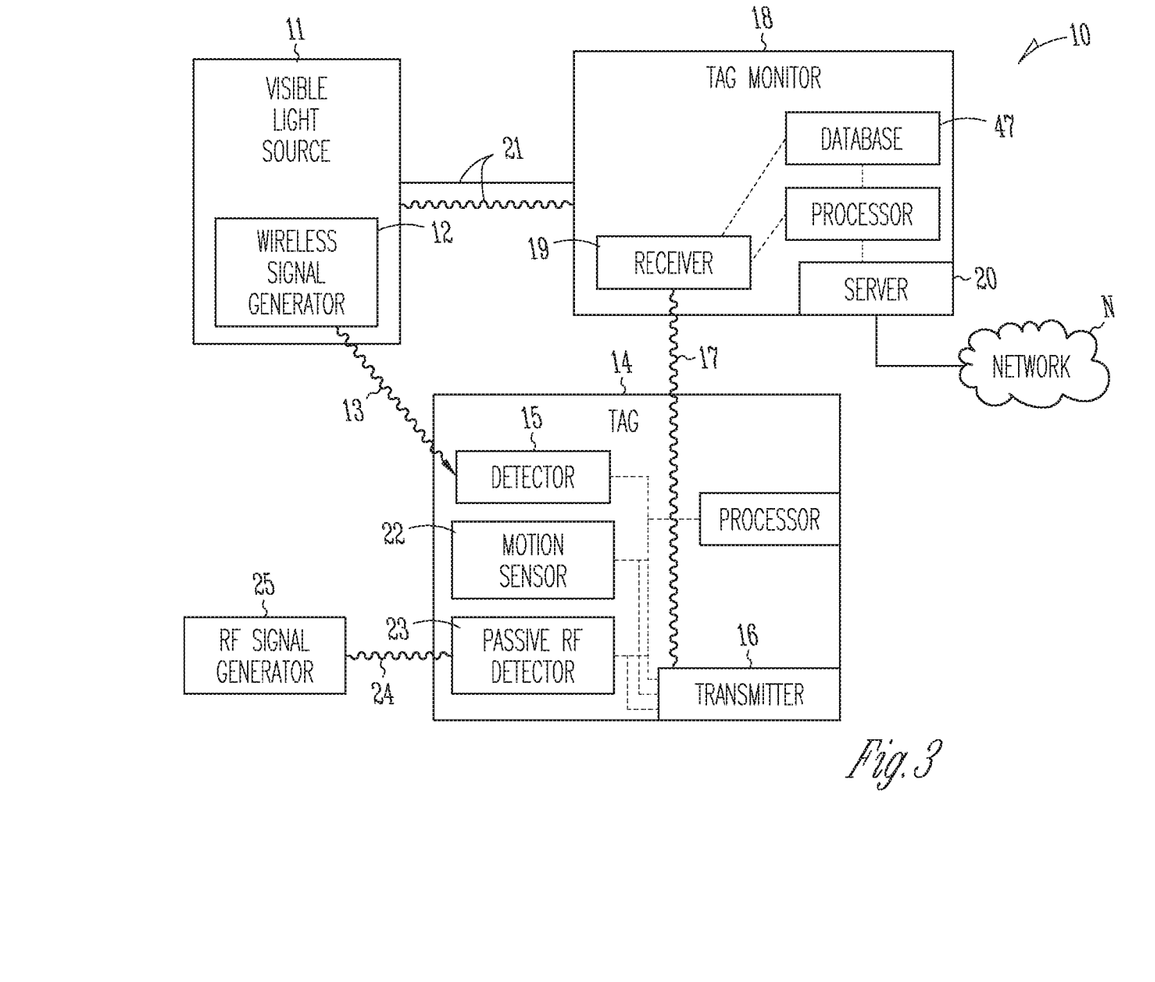
FIG. 3 illustrates yet another example system and method for tracking assets.
Figure 5:
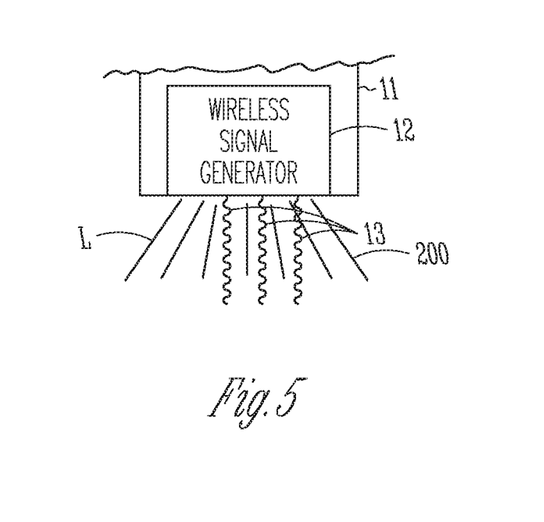
FIG. 5 illustrates an example visible light source that may be used in any of the systems and methods shown in FIGS. 1-3.

FIG. 5 illustrates an example visible light source that may be used in any of the systems and methods shown in FIGS. 1-3. The visible light source 11 may be any type of light source that produces visible light. An example form of a visible light source 11 includes, but is not limited to, LED lighting.

The wireless signals 13 that are sent from the wireless signal generator 12 to the detector 15 and the tag 14 may include at least one of optical signals, sound signals or electromagnetic signals at a particular frequency. The types of wireless signals 13 that are sent from the wireless signal generator 12 to the detector 15 will depend in part on the application where the system 10 is to be used as well as the type of tag 14 that is included in the system 10 (among other factors). In some forms, the wireless signals 13 may include any combination of optical signals, sound signals and electromagnetic signals at one or more particular frequencies.

In the example form of the system 10 shown in FIG. 1, the visible light source 11 is configured to receive signals 21 from the tag monitor 18 and produce the wireless signals 13 based on the signals 21 received from the tag monitor 18. As an example, the visible light source 11 may be configured to receive signals 21 from the tag monitor 18 through a hard-wired lighting infrastructure that provides power to the visible light source 11. It should be noted that the signals 21 and power may be provided from the tag monitor 18 to the visible light source 11 via separate hard-wired cables.

In other forms, the power and signals may be delivered from the tag monitor 18 to the visible light source 11 through a common cable. The ability to provide signals and power through one cable may allow the system 11 to be installed as part of the lighting infrastructure thereby providing numerous installation and cost benefits associated with installing, maintaining and operating the system 10. These benefits are due in part to the system 10 potentially being partially installed when each of the visible light sources 21 is installed within a facility.

Other forms of the system 10 are contemplated where the signals 21 are wireless signals. These wireless signals 21 may be used instead of, or in combination with, hard-wired signals 21. The type of signals 21 that are delivered from the tag monitor 18 to the visible light source 11 will depend in part on whether the system 10 is being newly installed or being retrofitted to an existing lighting system (among other factors).

FIG. 1 shows an example system 10 where the tag 14 includes a motion sensor 22 that determines when the tag 14 moves. In some forms, the detector 15 may begin detecting the wireless signals 13 when the tag 14 is activated by the motion sensor 22.

In some forms, the motion sensor 22 determines a velocity of the tag 14. When the motion sensor 22 determines a velocity of the tag 14, a rate at which the detector 15 detects the wireless signals 13 from the visible light source 11 may be determined based on the velocity of the tag 14. As an example, when the motion sensor 22 determines that the velocity of the tag 14 is increasing, the detector 15 may detect the wireless signals 13 from the wireless signal generator 12 at a greater rate.

The inclusion of a motion sensor 22 may provide at least two benefits. First, the battery life of the tag may be conserved because the detector may be shut down when the tag 14 is not moving. Second, the system 10 may be able to provide a more accurate location by having the detector 15 perform detection at a greater rate when the tag is moving faster thereby promoting a more accurate real time location of the tag 14.

It should be noted that any type of motion sensor that is known now, or discovered in the future, may be included in the system 10. The type of motion sensor 22 that will be included in the tag 14 will depend in part on the type of (i) tag; (ii) wireless signals 13 that need to be detected; and/or (iii) asset that requires tracking (among other factors).

FIG. 1 illustrates an example form of the system 10 where the tag 14 includes a passive RFID detector 23 that detects RFID signals 24. The transmitter 16 in the tag 14 is configured to receive the RFID signals 24 (directly or indirectly via a processor) from the passive RFID detector 23 and send the RFID signals 24 to the tag monitor 18 within the additional wireless signals 17.

The RFID signals 24 may be generated by an RF signal generator 25 that is located somewhere in the area where assets need to be tracked by the system 10. It should be noted that the area may include any number of RF signal generators 25 that would facilitate providing a relative location of the tag 14 within a designated area.

The tag monitor 18 may use the RFID signals 24 and the additional wireless signals 17 to determine the location of the tag 14. The manner in which the tag monitor 18 utilizes the RFID signals 24 and the additional wireless signals 17 to determine asset location will depend in part on the (i) type of electronic components that are included in the tag 14 and the tag monitor 18; (ii) accuracy required for tracking the assets that include the tag 14; and/or (iii) the relative distance of the tag 14 from the tag monitor 18 (among other factors).

One example application where the system 10 may be utilized includes hospitals or medical clinics. As an example, the system 10 may be used to track patients, drugs or medical equipment throughout hospitals. As another example, the system 10 may be utilized to track patients (e.g., babies) in order to ensure personal safety.

FIG. 2 illustrates another example system 30 for tracking assets. The system 30 includes a tag 34 that includes a wireless signal generator 32. The wireless signal generator 32 is configured to produce wireless signals 33. The tag 34 may be similar to any of the tags 14 described above.

The system 30 may further include a visible light source 31 that includes a detector 35 that detects the wireless signals 33 from the tag 34. The visible light source 31 includes a transmitter 36 that is configured to send signals 41. The signals 41 include information relating to a location of the tag 34 based on the wireless signals 33 received from the tag 34.

The system 30 further includes a tag monitor 38 that includes a receiver 39 that is configured to receive the signals 41 from the visible light source 31. The tag monitor 38 determines a location of the tag 34 based on the signals 41 that are received from the visible light source 31.

In some forms, the tag 34 may be configured to receive supplemental wireless signals 37 from the tag monitor 38. The tag 34 may emit the wireless signals 33 based on the supplemental wireless signals 37 that are received from the tag monitor 38.

In one example form similar to the system 10 described above, the tag monitor 38 may be configured to receive the signals 41 from the visible light source 31 through a lighting infrastructure that provides power to the visible light source 31. In addition, or alternatively, the signals 41 may be any combination of wired and/or wireless signals as discussed above.

In the example system 30 illustrated in FIG. 2, the visible light source 31 may be similar to any of the visible light sources 11 described above. In addition, the system 30 may further include a motion sensor 22 as described above. The system 30 may also include a passive RF detector 23 and one or more RF signal generators 25 as described above.

The system 30 shown in FIG. 2 may also include a server 20 that is connected to a network N as described above. The server 20 may or may not be integral with the tag monitor 38.

It should be noted that the types of tag monitors 18, 38 that are included the respective systems 10, 30 will depend in part on a variety of factors. These factors include the (i) application where the system is to be used; (ii) types of signals and wireless signals that are used and the respective systems; (iii) types of electronic components that are included in the respective systems; (iv) determination as to whether the systems will be part of a new infrastructure or retrofitted to an existing infrastructure; and/or (v) relative size of the area where the assets need to be tracked.

FIG. 3 illustrates another example system 50 for tracking assets. The system 50 is generally the same as the system 10 described relative to FIG. 1. The differences between system 50 and system 10 are described below.

In the system 50 illustrated in FIG. 3, the visible light source 21 is configured to produce electromagnetic signals 13. The electromagnetic signals 13 in system 50 may take the form of light that is anywhere on the electromagnetic spectrum. In addition, the detector 15 and the tag 14 is configured to detect the presence of the electromagnetic signals 13 produced by the visible light source 11.

In addition, the transmitter 16 in the tag 14 is configured to send wireless signals 17 that include information as to the particular frequency of the electromagnetic signals 13 that are detected by the detector 15.

The system 50 also includes a tag monitor 18 that includes a database 47. The database 47 includes Bluetooth signal distribution data relative to a location of the tag monitor 18. The tag monitor 18 compares the wireless signals 17 that are received from the tag 14 with the Bluetooth signal distribution data in the database 47. This comparison provides an estimate as to a location of the tag 14.

Therefore, the system 50 may provide a form of "Bluetooth fingerprinting" that may be useful in providing improved speed and accuracy when tracking assets within an area. In some forms of the system 50, the "Bluetooth fingerprinting" may provide location data when the electromagnetic signals 13 cannot be detected by the detector 15. As an example, the electromagnetic signals 13 may be blocked (for any reason) from reaching the detector 15 (e.g., optical signals may not reach the detector 15). As another example, there may be some form of equipment malfunction that renders the detector unable to detect the electromagnetic signals 13.

It should be noted that the Bluetooth signal distribution data that is included in the database 47 may be updated or added to the tag monitor 18 before or after installation of the system 50. In addition, the (i) tag 14; (ii) visible light source 11; and/or (iii) tag monitor 18 may be used to update the Bluetooth signal distribution data at any time during operation of the system 50.

Figure 6:
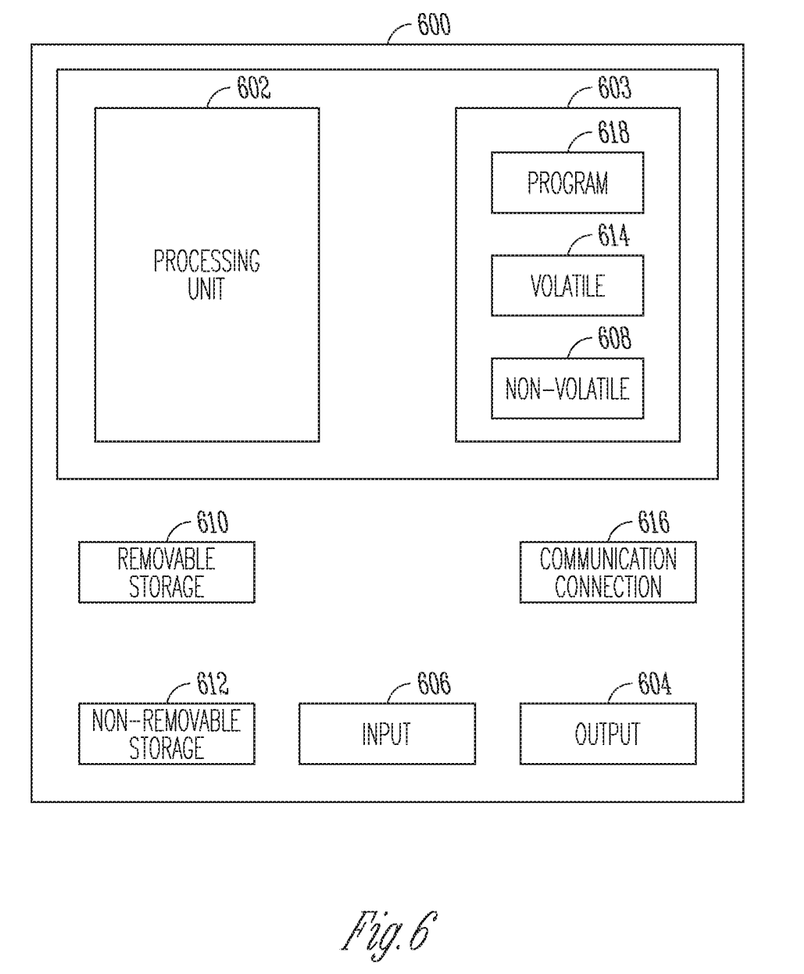
FIG. 6 is a block schematic diagram of a computer system that may be used to implement the systems and methods described herein.

FIG. 6 is a block schematic diagram of a computer system 600 to implement methods according to example embodiments. All components need not be used in various embodiments. One example computing device in the form of a computer 600, may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 600, the storage may also or alternatively include cloud-based storage accessible via a network, such as the Internet.

Memory 603 may include volatile memory 614 and non-volatile memory 608. Computer 600 may include—or have access to a computing environment that includes—a variety of computer-readable media, such as volatile memory 614 and non-volatile memory 606, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 602 of the computer 600. A hard drive, CD-ROM, and RAM are some examples of articles including a non-transitory computer-readable medium such as a storage device. The terms computer-readable medium and storage device do not include carrier waves. For example, a computer program 616 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. In example 1, a system for tracking assets. The system includes a visible light source that includes a wireless signal generator configured to produce wireless signals and a tag that includes a detector that detects the presence of the wireless signals produced by the visible light source. The tag includes a transmitter that is configured to send additional wireless signals. The system further includes a tag monitor that includes a receiver that is configured to receive the additional wireless signals. The tag monitor determines a location of the tag based on the additional wireless signals received from the tag.

2. The system of example 1 further comprising a server that is part of a network, wherein the server receives the tag location from the tag monitor and provides the location to other devices on the network.

3. The system of example 1 wherein the server is integral with the tag monitor.

4. The system of example 1 wherein the tag is configured to be worn by an individual.

5. The system of example 1 wherein the wireless signals include at least one of optical signals, sound signals or electromagnetic signals at a particular frequency.

6. The system of example 1 wherein the wireless signals include optical signals, sound signals and electromagnetic signals at a particular frequency.

7. The system of example 1 wherein the visible light source is configured to receive signals from the tag monitor and produce the wireless signals based on the signals received from the tag monitor.

8. The system of example 7 wherein the visible light source is configured to receive signals from the tag monitor through a lighting infrastructure that provides power to the visible light source.

9. The system of example 1 wherein the tag includes a motion sensor that determines when the tag moves, and wherein the detector begins detecting the wireless signals when activated by the motion sensor.

10. The system of example 9 wherein the motion sensor determines a velocity of the tag, wherein a rate at which the detector detects the wireless signals from the visible light source is determined by the velocity of tag.

11. The system of example 1 wherein the tag includes a passive RFID detector that detects RFID signals, wherein the transmitter in the tag is configured to receive the RFID signals from the passive RFID detector and send the RFID signals to the tag monitor within the additional wireless signals.

12. The system of example 11 wherein the tag monitor uses the RFID signals and the additional wireless signals to determine the location of the tag.

13. The system of example 1 wherein the additional wireless signal that are sent from the transmitter to the tag monitor includes at least one of Bluetooth or Wi-Fi signals.

14. The system of example 1 wherein the wireless signals that are sent from the visible light source to the tag includes at least one of Bluetooth or Wi-Fi signals.

15. In example 15, a system for tracking assets includes a tag that having a wireless signal generator configured to produce wireless signals and a visible light source that includes a detector that detects the wireless signals from the tag. The visible light source includes a transmitter that is configured to send signals that include information relating to a location of the tag based on the wireless signals received from the tag. The system further includes a tag monitor that includes a receiver that is configured to receive the signals from the visible light source. The tag monitor determines a location of the tag based on the signals received from the visible light source.

16. The system of example 15 wherein the tag is configured to be worn by an individual, and wherein the tag is configured to receive supplemental wireless signals from the tag monitor and emit the wireless signals based on the supplemental wireless signals received from the tag monitor.

17. The system of example 15 wherein the tag monitor is configured to receive the signals from the visible light source through a lighting infrastructure that provides power to the visible light source.

18. The system of example 15 wherein the tag includes a motion sensor that determines when the tag moves, and wherein the tag begins producing the wireless signals when activated by the motion sensor, and wherein the motion sensor determines a velocity of the tag, wherein a rate at which the tag produces the wireless signals is determined by the velocity of tag, and wherein the tag includes a passive RFID detector that detects RFID signals, wherein the tag includes the RFID signals within the wireless signals, and wherein the tag monitor uses the RFID signals and the additional wireless signals to determine the location of the tag.

19. The system of example 15 wherein the wireless signals include at least one of optical signals, sound signals or electromagnetic signals at a particular frequency.

20. The system of example 15 wherein the wireless signals include optical signals, sound signals and electromagnetic signals at a particular frequency.

21. In Example 21, a system for tracking assets includes a visible light source that is configured to produce electromagnetic signals and a tag that includes a detector that detects the presence of the electromagnetic signals produced by the visible light source. The tag includes a transmitter that is configured to send wireless signals that include information as to the particular frequency of the electromagnetic signals that are detected by the detector. The system further includes a tag monitor having a receiver that is configured to receive the wireless signals. The tag monitor determines a location of the tag based on the wireless signals received from the tag. The tag monitor includes a database that includes Bluetooth signal distribution data relative to a location of the tag monitor. The tag monitor compares the wireless signals received from the tag with the Bluetooth signal distribution data in the database to estimate a location of the tag.

22. The system of example 21 wherein the tag is configured to be worn by an individual.

23. The system of example 21 wherein the visible light source is configured to receive signals from the tag monitor and emit the electromagnetic signals at a particular frequency based on the signals received from the tag monitor.

Although a few forms have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system for tracking assets, the system comprising:
a visible light source that includes a wireless signal generator configured to produce wireless signals;
a tag that includes a detector that detects the presence of the wireless signals produced by the visible light source, wherein the tag includes a transmitter that is configured to send additional wireless signals; and
a tag monitor that includes a receiver that is configured to receive the additional wireless signals, wherein the tag monitor determines a location of the tag based on the additional wireless signals received from the tag, wherein the tag includes a motion sensor that determines when the tag moves, and wherein the detector begins detecting the wireless signals when activated by the motion sensor, wherein the motion sensor determines a velocity of the tag, wherein a rate at which the detector detects the wireless signals from the visible light source is determined by the velocity of the tag.

2. The system of claim 1 further comprising a server that is part of a network, wherein the server receives the tag location from the tag monitor and provides the location to other devices on the network.

3. The system of claim 2 wherein the server is integral with the tag monitor.

4. The system of claim 1 wherein the tag is configured to be worn by an individual.

5. The system of claim 1 wherein the wireless signals include at least one of optical signals, sound signals or electromagnetic signals at a particular frequency.

6. The system of claim 1 wherein the wireless signals include optical signals, sound signals and electromagnetic signals at a particular frequency.

7. The system of claim 1 wherein the visible light source is configured to receive signals from the tag monitor and produce the wireless signals based on the signals received from the tag monitor.

8. The system of claim 7 wherein the visible light source is configured to receive signals from the tag monitor through a lighting infrastructure that provides power to the visible light source.

9. The system of claim 1 wherein the additional wireless signal that are sent from the transmitter to the tag monitor includes at least one of Bluetooth or Wi-Fi signals.

10. The system of claim 1 wherein the wireless signals that are sent from the visible light source to the tag includes at least one of Bluetooth or Wi-Fi signals.

11. A system for tracking assets, the system comprising:
a visible light source that includes a wireless signal generator configured to produce wireless signals;
a tag that includes a detector that detects the presence of the wireless signals produced by the visible light source, wherein the tag includes a transmitter that is configured to send additional wireless signals; and
a tag monitor that includes a receiver that is configured to receive the additional wireless signals, wherein the tag monitor determines a location of the tag based on the additional wireless signals received from the tag, wherein the tag includes a passive RFID detector that detects RFID signals, wherein the transmitter in the tag is configured to receive the RFID signals from the passive RFID detector and send the RFID signals to the tag monitor within the additional wireless signals.

12. The system of claim 11 wherein the tag monitor uses the RFID signals and the additional wireless signals to determine the location of the tag.

13. A system for tracking assets, the system comprising:
a tag that include a wireless signal generator configured to produce wireless signals;
a visible light source that includes a detector that detects the wireless signals from the tag, wherein the visible light source includes a transmitter that is configured to send signals that include information relating to a location of the tag based on the wireless signals received from the tag; and
a tag monitor that includes a receiver that is configured to receive the signals from the visible light source, wherein the tag monitor determines a location of the tag based on the signals received from the visible light source, wherein the tag is configured to be worn by an individual, and wherein the tag is configured to receive supplemental wireless signals from the tag monitor and emit the wireless signals based on the supplemental wireless signals received from the tag monitor.

14. The system of claim 13 wherein the tag monitor is configured to receive the signals from the visible light source through a lighting infrastructure that provides power to the visible light source.

15. The system of claim 1 wherein the wireless signals include at least one of optical signals, sound signals or electromagnetic signals at a particular frequency.

16. The system of claim 13 wherein the wireless signals include optical signals, sound signals and electromagnetic signals at a particular frequency.

17. A system for tracking assets, the system comprising:
a tag that include a wireless signal generator configured to produce wireless signals;
a visible light source that includes a detector that detects the wireless signals from the tag, wherein the visible light source includes a transmitter that is configured to send signals that include information relating to a location of the tag based on the wireless signals received from the tag; and a tag monitor that includes a receiver that is configured to receive the signals from the visible light source, wherein the tag monitor determines a location of the tag based on the signals received from the visible light source, wherein the tag includes a motion sensor that determines when the tag moves, and wherein the tag begins producing the wireless signals when activated by the motion sensor, and wherein the motion sensor determines a velocity of the tag, wherein a rate at which the tag produces the wireless signals is determined by the velocity of tag, and wherein the tag includes a passive RFID detector that detects RFID signals, wherein the tag includes a passive RFID detector that detects RFID signals, wherein the tag includes the RFID signals within the wireless signals.

18. A system for tracking assets, the system comprising:

a tag that include a wireless signal generator configured to produce wireless signals;

a visible light source that includes a detector that detects the wireless signals from the tag, wherein the visible light source includes a transmitter that is configured to send signals that include information relating to a location of the tag based on the wireless signals received from the tag; and a tag monitor that includes a receiver that is configured to receive the signals from the visible light source, wherein the tag monitor determines a location of the tag based on the signals received from the visible light source, wherein the tag includes a motion sensor that determines when the tag moves, and wherein the tag begins producing the wireless signals when activated by the motion sensor, and wherein the motion sensor determines a velocity of the tag, wherein a rate at which the tag produces the wireless signals is determined by the velocity of the tag.

* * * * *